United States Patent
Heubel et al.

(10) Patent No.: US 10,075,251 B2
(45) Date of Patent: Sep. 11, 2018

(54) HAPTIC BROADCAST WITH SELECT HAPTIC METADATA BASED ON HAPTIC PLAYBACK CAPABILITY

(71) Applicant: Immersion Corporation, San Jose, CA (US)

(72) Inventors: Robert W. Heubel, San Leandro, CA (US); Paige Raynes, Walnut Creek, CA (US)

(73) Assignee: Immersion Corporation, San Jose, CA (US)

( * ) Notice: Subject to any disclaimer, the term of this patent is extended or adjusted under 35 U.S.C. 154(b) by 0 days.

(21) Appl. No.: 15/427,240

(22) Filed: Feb. 8, 2017

(65) Prior Publication Data

US 2018/0227063 A1    Aug. 9, 2018

(51) Int. Cl.
*G08B 21/00* (2006.01)
*H04H 20/86* (2008.01)
*G08B 6/00* (2006.01)

(52) U.S. Cl.
CPC ............. *H04H 20/86* (2013.01); *G08B 6/00* (2013.01)

(58) Field of Classification Search
CPC ............ G06F 3/016; G08B 6/00; H04H 20/86
USPC ................. 340/407.1, 691.1, 691.8
See application file for complete search history.

(56) References Cited

U.S. PATENT DOCUMENTS

| | | | |
|---|---|---|---|
| 9,098,984 B2 | 8/2015 | Heubel | |
| 9,349,264 B2 | 5/2016 | Heubel | |
| 9,349,378 B2 | 5/2016 | Bharitkar et al. | |
| 9,354,704 B2 | 5/2016 | Lacroix et al. | |
| 2014/0055358 A1* | 2/2014 | Birnbaum | G06F 3/016 345/168 |
| 2014/0218184 A1 | 8/2014 | Grant et al. | |
| 2014/0347177 A1 | 11/2014 | Phan et al. | |
| 2015/0070154 A1* | 3/2015 | Levesque | G06F 3/165 340/407.1 |
| 2015/0109220 A1* | 4/2015 | Yliaho | G06F 3/016 345/173 |
| 2016/0150294 A1* | 5/2016 | Phatak | H04N 21/23424 725/23 |

FOREIGN PATENT DOCUMENTS

WO    0133760 A2    5/2001
WO    2013096327 A1   6/2013

* cited by examiner

*Primary Examiner* — Mark Rushing
(74) *Attorney, Agent, or Firm* — Miles & Stockbridge P.C.

(57) ABSTRACT

Broadcasting select haptic metadata includes broadcasting a broadcast signal to haptic-enabled devices. In response, haptic playback capability information is received at a host source from a haptic-enabled device when original haptic metadata in the broadcast signal encodes haptic information incompatible with the haptic playback capability information. The select haptic metadata, which is customized for the haptic playback capability information, is generated and sent from the host source to the haptic-enabled device.

20 Claims, 7 Drawing Sheets

HAPTIC BROADCAST WITH SELECT HAPTIC METADATA BASED ON HAPTIC PLAYBACK CAPABILITY

FIELD

Example embodiments are directed to broadcasting haptic effects, and more particularly, to broadcasting haptic effects with select haptic metadata.

BACKGROUND

Haptics is a tactile and force feedback technology that generates haptic feedback effects (also known as "haptic feedback" or "haptic effects"), such as forces, vibrations, and motions, for an end-user using the end user's sense of touch. Devices, (e.g., mobile devices, touchscreen devices, personal computers, and wearable devices) can include embedded hardware (e.g., actuators or other output mechanisms) configured to generate the haptic effects. The embedded hardware is, generally, programmed to generate a particular set of haptic effects. When a call specifying which haptic effect to play is received by the device, the device generates (or produces) the specified haptic effect. For example, when a user interacts with a device using, for example, a button, touchscreen, lever, joystick, wheel, or some other control, the device can send a play command through control circuitry to the embedded hardware. The embedded hardware then generates the appropriate haptic effect.

When a haptic effect is created by a haptic creator/editor/designer, the haptic effect can be authored under an assumption that a playback of the haptic effect occurs, for example, at a specific playback speed, rate and/or volume. Because various types of embedded hardware are used for different devices, the playback of the haptic effect may vary from that intended by the haptic creator depending on the type of embedded hardware in a particular device. For instance, if the embedded hardware in an end-user's device is not configured to playback the haptic effect at the specified speed, rate or volume, the playback of the haptic effect is distorted (for example, by occurring at a different playback rate or at an undesirable volume). The playback of the haptic effect at a different playback rate or at an undesirable volume can distort an end user's experience of the haptic effect.

SUMMARY

One embodiment broadcasts select haptic metadata using a broadcast signal by broadcasting the broadcast signal to haptic-enabled devices. The broadcast signal includes original haptic metadata received from a host source. Haptic playback capability information is received at the host source from a haptic-enabled device of the haptic-enabled devices when the original haptic metadata encodes haptic information incompatible with the haptic playback capability information. The select haptic metadata, which is customized for the haptic playback capability information, is generated and sent from the host source to the haptic-enabled device.

BRIEF DESCRIPTION OF THE DRAWINGS

Example embodiments will be more clearly understood from the following detailed description taken in conjunction with the accompanying drawings.

FIG. 1 is a flow diagram of sending select haptic metadata using a broadcast signal according to an example embodiment.

FIG. 2 is a flow diagram of sending select haptic metadata using a broadcast signal according to an example embodiment.

FIG. 3 is a flow diagram of integrating original haptic metadata into a broadcast signal according to an example embodiment.

FIG. 4 is a flow diagram of integrating original haptic metadata into a broadcast signal according to an example embodiment.

FIG. 5 is a flow diagram of integrating original haptic metadata into a broadcast signal according to an example embodiment.

FIG. 6 is a block diagram of a haptic broadcast system according to an example embodiment.

FIG. 7 is a block diagram of a system in an end-user device according to an example embodiment.

DETAILED DESCRIPTION

Example embodiments are directed to broadcasting select haptic metadata customized for an end-user haptic device by providing feedback indicating haptic playback capabilities of the end-user haptic device to a host source.

Example embodiments provide for reliable transmission, and consistent and customized playback of haptic data through a broadcast signal to end-user haptic-enabled device(s) (e.g., tablet, mobile telephone, television, gaming console, virtual reality system, etc.) without having to encode all possible haptic playback capabilities in the select haptic data played back on the end-user haptic-enabled devices. For instance, in a sports broadcast, sensors that detect force(s) or event(s) (e.g., a hit, a fall, a drop, a jump, a score, etc.) can be placed on a player or equipment (e.g., a ball, a goal, a stick, a helmet, etc.) used in a sports game. Alternatively, a haptic creator can designate an effect to simulate the force(s) or event(s) experienced by the player or the equipment. The information collected from the sensors, and/or the effect designated by the haptic creator is haptic data. The haptic data can be collected, and converted, into haptic metadata.

The haptic metadata can be data information that provides information about haptic data. The haptic metadata can encode information about the type of haptic parameters (e.g., magnitude, frequency, duration, etc.) necessary to generate haptic effect(s) (e.g., forces, vibrations, and motions) corresponding to the haptic data (e.g., the hit, the fall, the drop, the jump, the score, etc.) for end-users of the end-user haptic-enabled devices. The haptic metadata may be transmitted via the broadcast signal through a broadcast stream (e.g., the internet) to the haptic-enabled devices. Hardware (e.g., actuators, etc.) embedded in the haptic-enabled devices generates the haptic effect(s) for the end-users based on the haptic metadata. Thus, the end-users may experience an event or view a pre-recorded event by receiving corresponding haptic sensations.

The type of embedded hardware used in the haptic-enabled devices varies from device to device. For example, actuators typically used in a cellular phone may be different than actuators which are typically used in handheld controllers of a gaming system. Therefore, the cellular phone and the gaming system generally require a select portion of the haptic information that is encoded in haptic metadata that includes coding for all possible haptic playback capabilities of various haptic-enabled devices.

Figure 1:
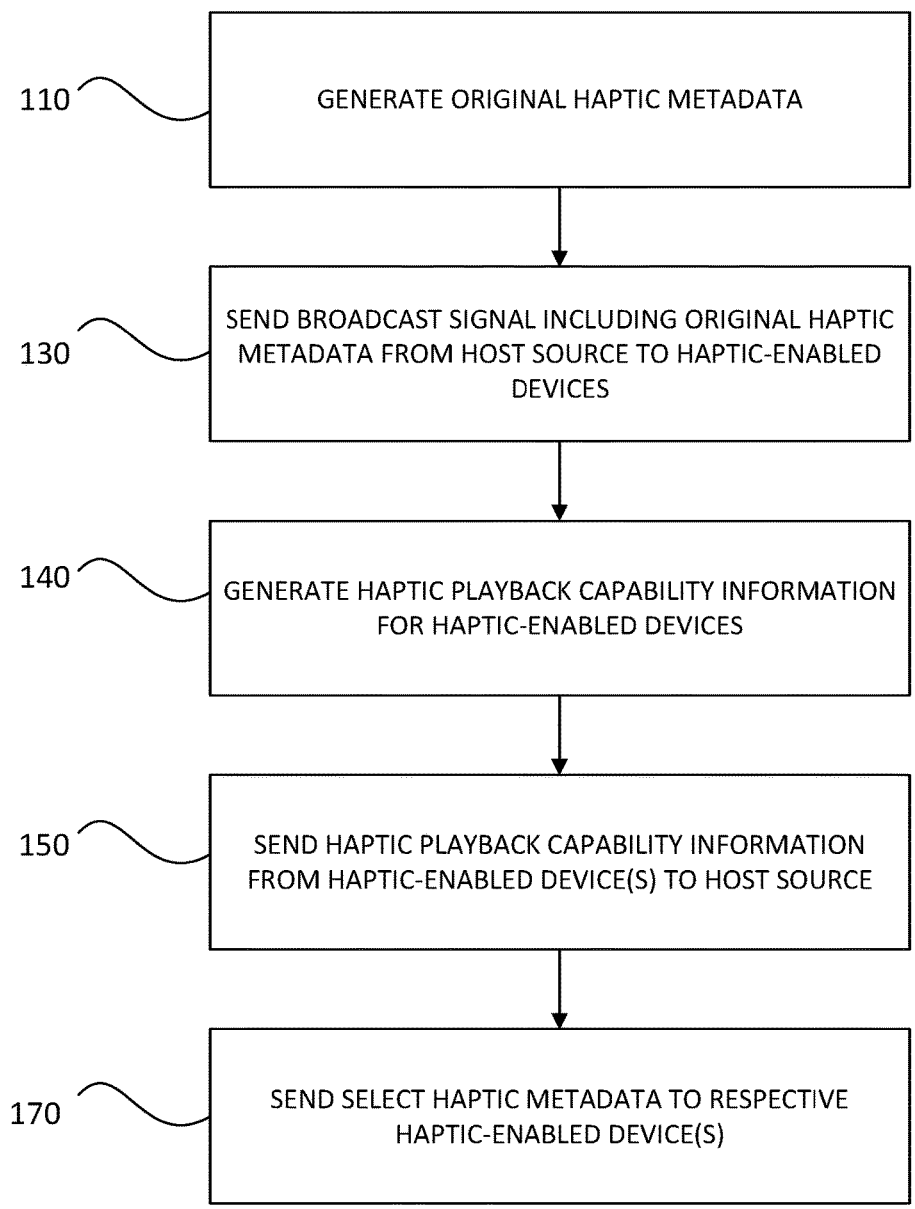
FIGS. 1-7 represent non-limiting, example embodiments as described herein.

FIG. 1 is a flow diagram of sending select haptic metadata using a broadcast signal according to an example embodiment.

Referring to FIG. 1, sending select haptic metadata using a broadcast signal according to an example embodiment includes generating original haptic metadata, at 110. The original haptic metadata may encode haptic information that specifies a type of haptic parameter(s) to be played back on one or more haptic-enabled devices.

The original haptic metadata is, then, integrated in the broadcast signal by any of the processes described in further detail below.

At 130, the broadcast signal, including the original haptic metadata, is broadcast (or transmitted) from a host source to the haptic-enabled devices. The broadcast signal is transmitted by sending the broadcast signal to the haptic-enabled devices via transmission modes that may be different from each other. For instance, the transmission modes may be selected from cable, direct broadcast satellite, a fiber-optic communication network, over-the-air programming, a wireless communication network, and radio waves.

According to an example embodiment, the broadcast signal may synchronously (i.e., the same haptic effect to all of the haptic-enabled devices), or asynchronously (i.e., different haptic effects to different haptic-enabled devices depending on location) transmit the original haptic metadata to the haptic-enabled devices. For example, the broadcast signal may asynchronously transmit the original haptic metadata to a group of haptic-enabled devices at different locations within a stadium depending on the proximity of each of the haptic-enabled devices to a band performing in a center of the stadium.

At 140, haptic playback capability information is generated for each of the haptic-enabled devices. The haptic playback capability information is generated by determining a haptic playback capability of each of the haptic-enabled devices for the original haptic metadata.

The haptic playback capability of each of the haptic-enabled devices may be determined by identifying a device type, and/or embedded hardware configured to generate haptic effects, for each of the haptic-enabled devices using software respectively in each of the haptic-enabled devices. For example, one haptic-enabled device may be identified as a gamepad having a small and large actuator, and another haptic-enabled device may be identified as a mobile handset having a specific type of mobile actuator. The haptic playback capability may be determined prior to playback of a haptic track corresponding to the original haptic metadata.

According to an example embodiment, the haptic playback capability (e.g., the device type, and/or the hardware configured to generate haptic effects) may be determined using a validation device (e.g., a second TV or TV box). The validation device may be external to the respective haptic-enabled device, or separate from a haptic system (see haptic system 716 in FIG. 7) in the respective haptic-enabled device.

At 150, if the original haptic metadata encodes haptic information incompatible with the respective haptic playback capability information of one or more of the haptic-enabled devices, the respective haptic playback capability information is sent by the respective haptic-enabled device to the host source.

The host source may then generate select haptic metadata by modifying the original haptic metadata such that the select haptic metadata encodes select haptic information customized for (or, compatible with) the respective haptic playback capability information. The original haptic metadata may be modified by adding additional haptic metadata to the original haptic metadata, removing unusable haptic metadata from the original haptic metadata, or changing (or, editing) at least one parameter of the original haptic metadata.

Alternatively, the host source may select haptic effects for the select haptic metadata from a designated database.

At 170, the host source sends the select haptic metadata to the respective haptic-enabled devices. By generating select haptic metadata for the haptic-enabled devices, the example embodiments may include sending the select haptic metadata using less bandwidth, or a file size smaller, than that used when broadcasting/transmitting the broadcast signal.

According to an example embodiment, the broadcast signal, the haptic playback capability information, and the select haptic metadata may each be sent (or, transmitted) through the same media broadcast stream of the respective haptic-enabled device.

Figure 2:
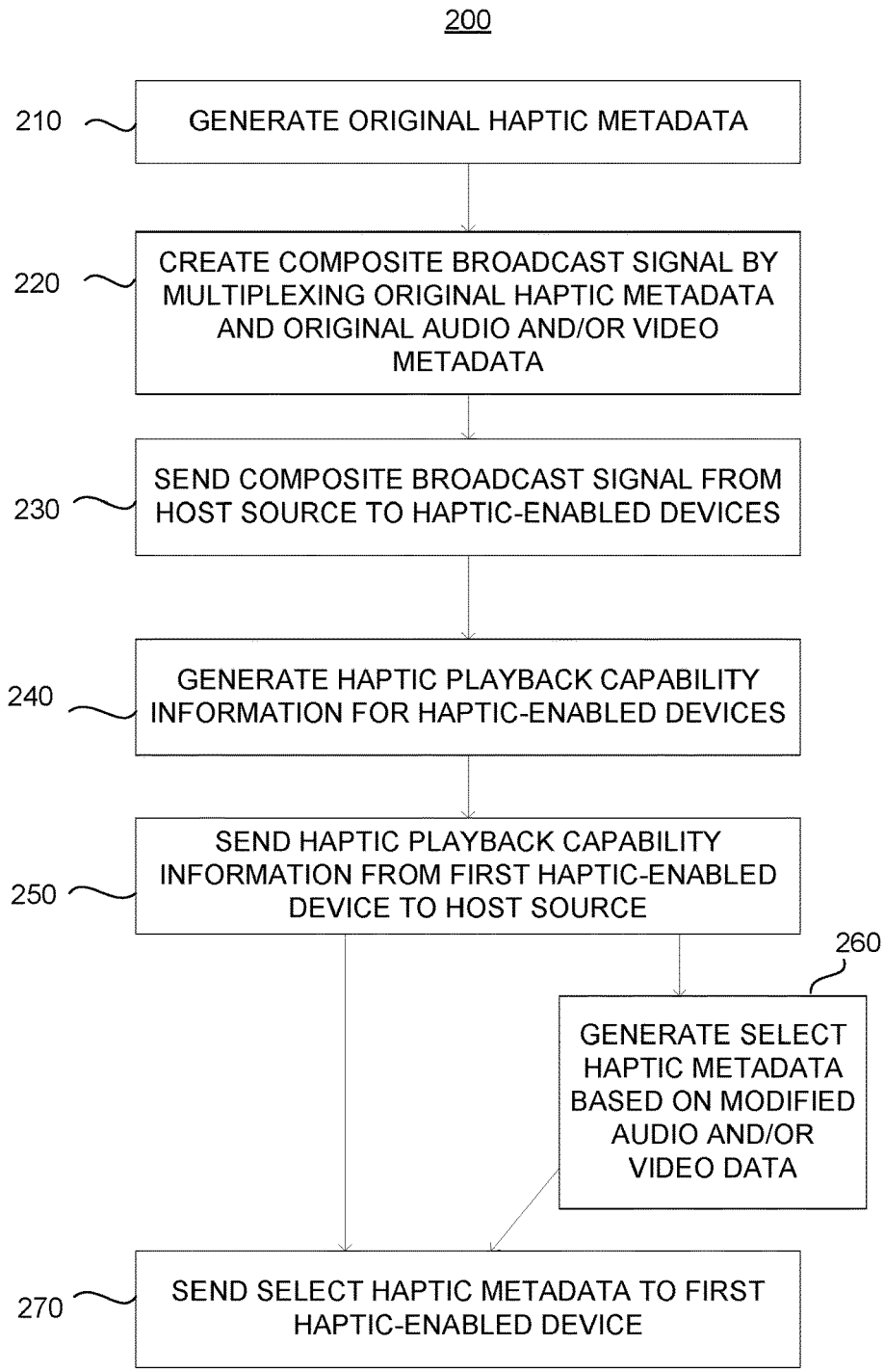

FIG. 2 is a flow diagram of sending select haptic metadata using a broadcast signal according to an example embodiment.

Referring to FIG. 2, sending select haptic metadata using a broadcast signal according to an example embodiment includes similar steps as described in conjunction with the functionality shown in FIG. 1 (as indicated by the use of similar numerals). A description of the similar steps is omitted for the sake of brevity.

At 220, the functionality further includes multiplexing (or adding) the original haptic metadata and original audio and/or video metadata to create a composite broadcast signal. For example, when a user creates and/or intends to share audio/video ("A/V") data of an event, the user may provide recommendations/suggestions for haptic effects to associate with the A/V data. According to an example embodiment, the user may select a haptic effect from a set of pre-designed haptic effects in a database and associate the selected haptic effect with the AN data, or with one or more portions of the AN data.

At 230, the composite broadcast signal is then broadcast (or transmitted) to the haptic-enabled devices in the same manner as the broadcast signal at 130 as described in conjunction with FIG. 1.

According to an example embodiment, the original audio and/or video metadata may be modified by a haptic editor (a person making an edit to the metadata), or modified due to audio/video capabilities of the haptic-enabled devices. At 260, if the original audio and/or video metadata is modified, the host source may generate select haptic metadata by modifying the original haptic metadata such that the select haptic metadata (i) encodes select haptic information compatible with the respective haptic playback capability information and (ii) corresponds to audio/video data encoded by the modified audio and/or video metadata.

Alternatively, the host source may select haptic effects for the select haptic metadata from a designated database.

At 270, the host source sends the select haptic metadata to the respective haptic-enabled device.

Figure 3:
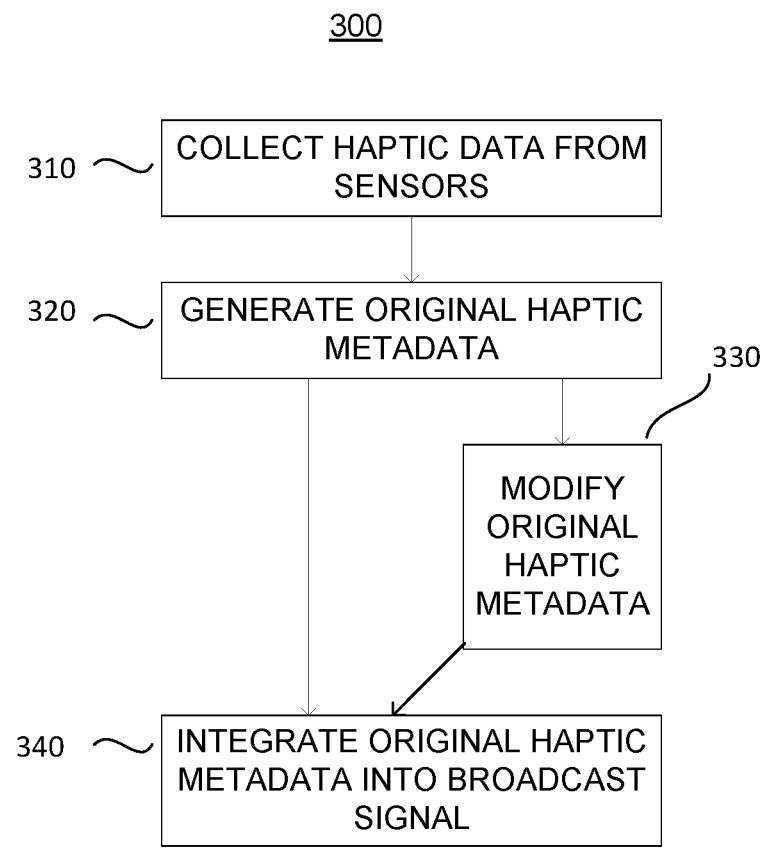

FIG. 3 is a flow diagram of integrating original haptic metadata into a broadcast signal according to an example embodiment.

Referring to FIG. 3, integrating original haptic metadata into a broadcast signal according to an example embodiment includes collecting haptic data from sensors on equipment and/or persons, at 310. At 320, original haptic metadata is generated from the collected haptic data.

At 330, a haptic editor (a person making an edit to haptic metadata), optionally, can modify the original haptic metadata by adding additional haptic metadata, removing unusable haptic metadata from the original haptic metadata, or changing (or, editing) at least one parameter of the original haptic metadata. For example, football players on a field may have force sensors embedded in their helmets that collect data that is used to create the original haptic metadata. However, the haptic editor may not want the end-users to feel all of the impacts from all of the players. Therefore, the haptic editor can modify the original haptic metadata to include impacts from certain players at certain times by removing haptic metadata or change a parameter so that the end-users feel a stronger or weaker force.

At 340, the original haptic metadata (or, alternatively, the modified version of the original haptic metadata) is integrated into a broadcast signal as a haptic metadata packet. The original haptic metadata (or, alternatively, the modified version of the original haptic metadata) may be automatically integrated into the broadcast signal.

Figure 4:
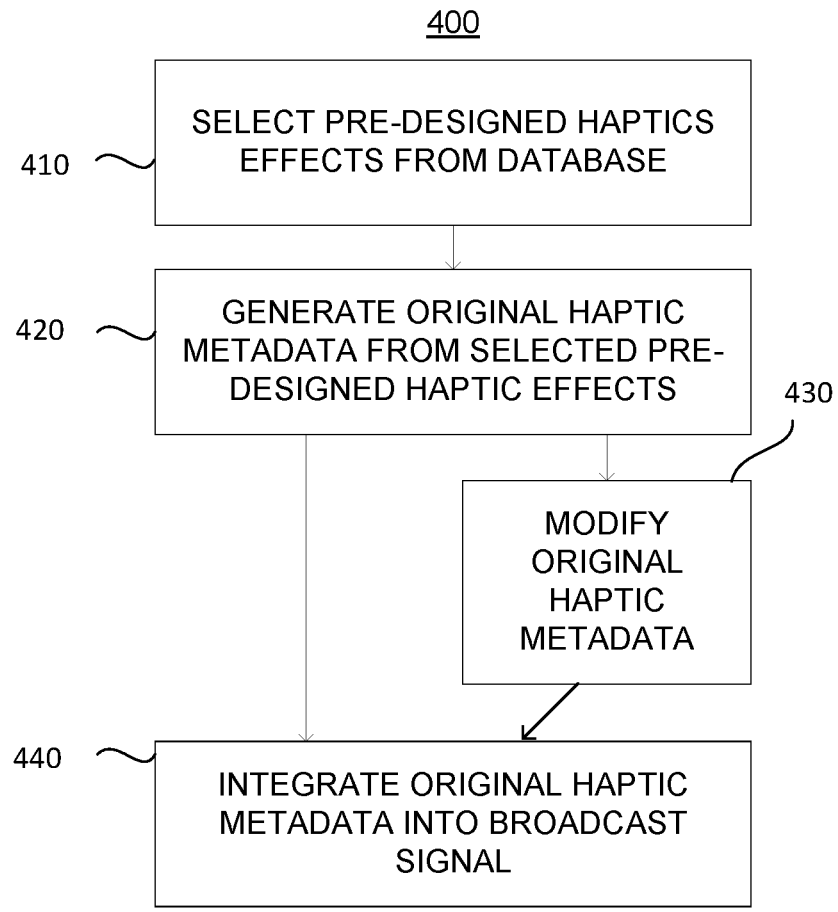

FIG. 4 is a flow diagram of integrating original haptic metadata into a broadcast signal according to an example embodiment.

Referring to FIG. 4, integrating original haptic metadata into a broadcast signal according to an example embodiment includes selecting pre-designed haptic effects from a pre-designed haptic effects database, in real-time, based on specific audio and/or visual cues occurring during an event, at 410. Different "types" of the pre-designed haptic effects may correspond to different types of events. Example types of pre-designed haptic effects include vibration, jolt, detent, pop, etc. According to an example embodiment, a first type of haptic effect can indicate an event related to a player (e.g., hitting, being hit, falling, jumping, etc.), while a second type of haptic effect can indicate an event related to a gameplay (e.g., a score, a timeout, etc.).

At 420, original haptic metadata is generated from the selected pre-designed haptic effects.

At 430, a haptic editor (a person making an edit to the haptic metadata), optionally, can modify or tune the original haptic metadata to more specifically match the event by adding additional haptic metadata, removing unusable haptic metadata from the original haptic metadata, or changing (or, editing) at least one parameter of the original haptic metadata. For instance, the haptic editor may modify the original haptic metadata to emphasize (i.e., provided with greater intensity) or reduced (i.e., provided with less intensity) an intensity level of the selected pre-designed haptic effect. Thus, for example, an end-user might feel a strong vibration in response to a football player being tackled, and a weak vibration in response to a football player stepping out of bounds on the field.

According to an example embodiment, high level parameters that define a particular haptic effect include magnitude, frequency, and duration. Low level parameters such as streaming motor commands could also be used to render a particular haptic effect. Some variation of these parameters can change the feel of the haptic effect, and/or can further cause the haptic effect to be considered "dynamic."

At 440, the original haptic metadata (or, alternatively, the modified version of the original haptic metadata) is integrated into a broadcast signal as a haptic metadata packet. The original haptic metadata (or, alternatively, the modified version of the original haptic metadata) may be automatically integrated into the broadcast signal.

Figure 5:
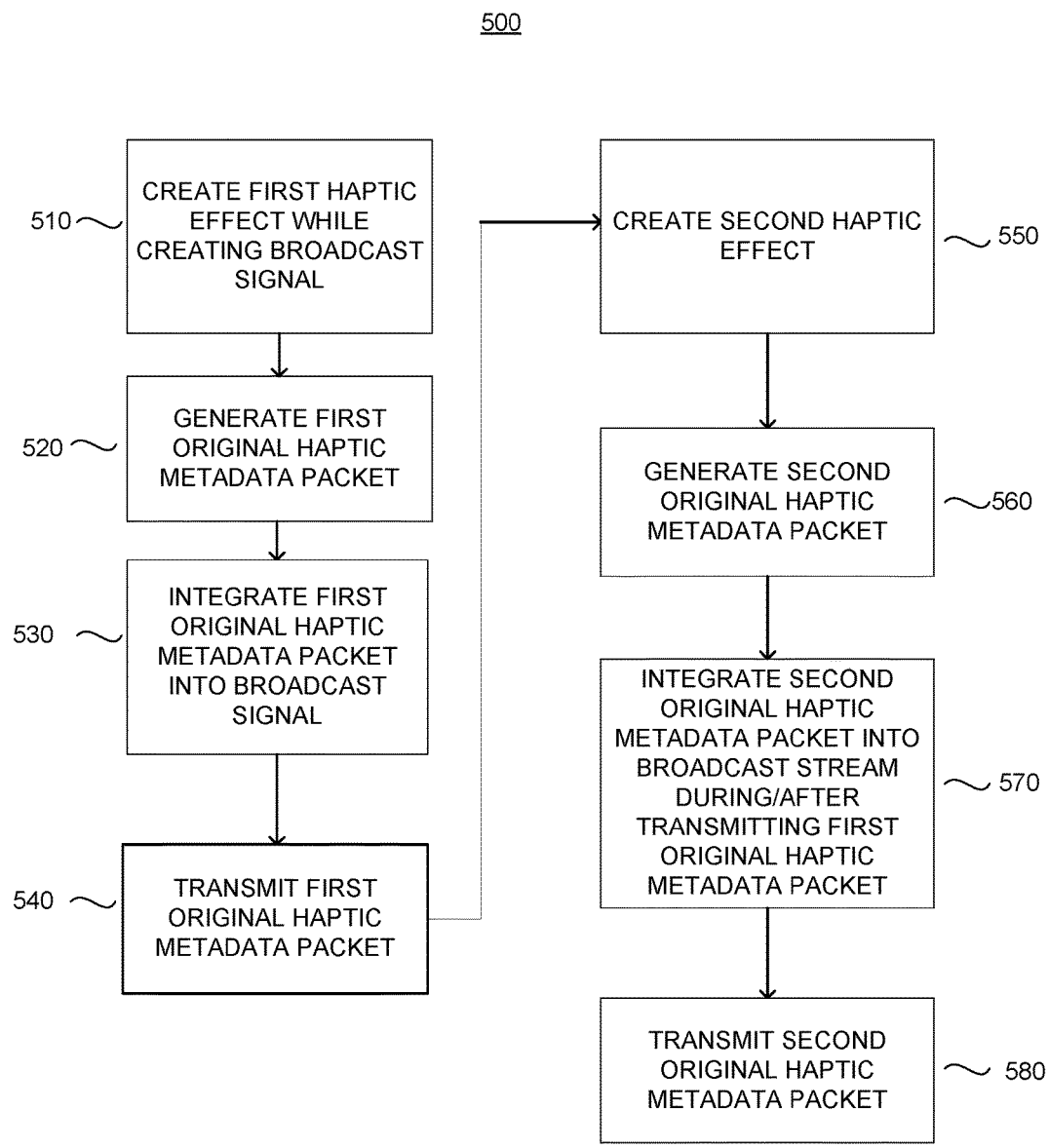

FIG. 5 is a flow diagram of integrating original haptic metadata into a broadcast signal according to an example embodiment.

Referring to FIG. 5, integrating original haptic metadata into a broadcast signal according to an example embodiment includes, at 510, creating a first haptic effect, in real-time, using haptic creation tools when an event occurs. The first haptic effect may be created by a haptic creator, or a haptic synthesizer. The first haptic effect is simultaneously created as a broadcast signal is created. For example, the first haptic effect may be simultaneously created as an audio/video signal is embedded in a broadcast signal.

For example, the haptic creator can create a first effect to represent the feeling of a quarterback throwing a pass to a player, and designate that the first effect only be played on a left actuator of a rumble pad. The haptic creator can create a second effect to represent for the feeling of a receiver catching a football pass, and designate that the second effect only be played on a right actuator of the rumble pad.

According to other example embodiments, the haptic creator can designate certain effects to only be played on certain devices (e.g., mobile phones or rumble pads or an eccentric rotating mass motor ("ERM") or a linear resonant actuator ("LRA") actuators).

At 520, a first original haptic metadata packet is generated from the first haptic effect.

At 530, the first original haptic metadata packet is integrated into a broadcast signal.

At 540, the first original haptic metadata packet is broadcast/transmitted in real time to the end-user devices via the broadcast signal. For example, as an event is watched live by the end-users, the first haptic effect is created, converted, integrated into the broadcast signal, and transmitted to the end-users.

At 550, a second haptic effect is created, in real-time, using the haptic creation tools as the event is occurring.

At 560, a second original haptic metadata packet is generated from the second haptic effect.

At 570, the second original haptic metadata packet is integrated into a broadcast stream of the broadcast signal, after or during transmission of the first haptic metadata packet.

At 580, the second original haptic metadata packet is broadcast/transmitted in real time to the end-user devices via the broadcast stream.

According to an alternative example embodiment, the event can be watched at a later time, and the haptic effects may be stored in order to be converted and provided to the end-users at a later time.

Figure 6:
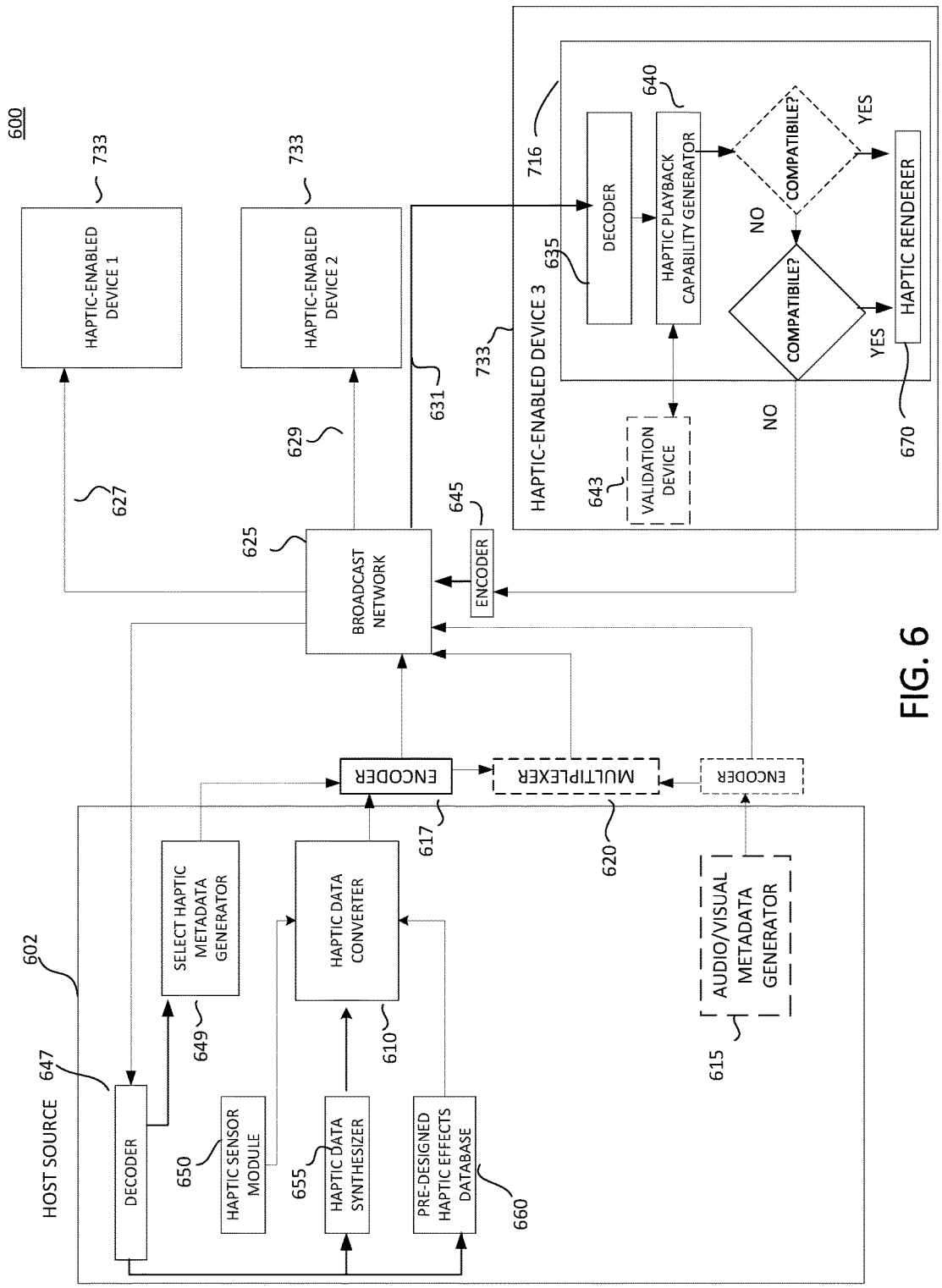

FIG. 6 is a block diagram of a haptic broadcast system 600 according to an example embodiment.

Referring to FIG. 6, haptic broadcast system 600 according to example embodiments includes a host source 602. Host source 602 obtains haptic data from a haptic sensor module 650, a haptic data synthesizer 655 and/or a pre-designed haptic effects database 660, and transmits the haptic data to a haptic data converter 610.

According to an example embodiment, haptic sensor module 650 receives a signal (e.g., an electrical signal) representing haptic sensor information from one or more sensors (not shown). The sensors detect a form of energy, or other physical property, and convert the detected energy, or other physical property, into the signal. The sensors send the signal to haptic sensor module 650 through a communication device (not shown). The sensors can be configured to detect a form of energy, or other physical property, such as, but not limited to, sound, movement, acceleration, physiological signals, distance, flow, force/pressure/strain/bend, humidity, linear position, orientation/inclination, radio frequency, rotary position, rotary velocity, manipulation of a switch, temperature, vibration, or visible light intensity.

The one or more sensors can be any device, such as, but not limited to, a motion sensor, an accelerometer, an electrocardiogram, an electroencephalogram, an electromyograph, an electrooculogram, an electropalatograph, a galvanic skin response sensor, a capacitive sensor, a hall effect sensor, an infrared sensor, an ultrasonic sensor, a pressure sensor, a fiber optic sensor, a flexion sensor (or bend sensor), a force-sensitive resistor, a load cell, a LuSense CPS2 155, a miniature pressure transducer, a piezo sensor, a strain gage, a hygrometer, a linear position touch sensor, a linear potentiometer (or slider), a linear variable differential transformer, a compass, an inclinometer, a magnetic tag (or radio frequency identification tag), a rotary encoder, a rotary potentiometer, a gyroscope, an on-off switch, a temperature sensor (e.g., a thermometer, a thermocouple, a resistance temperature detector, a thermistor, or a temperature-transducing integrated circuit), a microphone, a photometer, an altimeter, a biological monitor, a camera, or a light-dependent resistor.

The one or more sensors may be part of a sensor array, or some other type of collection of sensors.

According to an example embodiment, haptic effects can be created using haptic creation tools in haptic data synthesizer 655 when an event occurs. Haptic data synthesizer 655 may be controlled by a haptic creator. The haptic effects may be created in real-time (or simultaneously) as a broadcast signal (in which the corresponding original haptic metadata will be integrated) is being created.

According to an example embodiment, audio and/or visual cues occurring during an event can be haptified by selecting pre-designed haptic effects stored in pre-designed haptic effects database 660 (e.g., based on a lookup table of the pre-designed effects stored in pre-designed haptic effects database 660). Upon selection, the pre-designed haptic effects can be modified or tuned to more specifically match the event by adding additional haptic metadata, removing unusable haptic metadata from the original haptic metadata, or changing (or, editing) at least one parameter of the original haptic metadata. The modification or tuning may be performed by a haptic editor (a person making an edit to the haptic metadata), haptic modification tools, etc.

The audio (or visual) cues associated with the event may be haptified by using an audio (or visual) to haptics conversion algorithm. For example, an audio to haptics conversion algorithm as disclosed in U.S. Pat. No. 9,368,005 may be used.

According to an example embodiment, only certain portions of the audio and/or visual cues may be haptified rather than entire cue(s). Therefore, example embodiments may use haptic conversion algorithms configured for those portions of the audio and/or visual cues to provide enhanced haptic metadata.

According to an alternative example embodiment, haptic sensor module 650, haptic data synthesizer 655 and/or pre-designed haptic effects database 660 may each be in a device different from host source 602. When haptic sensor module 650, haptic data synthesizer 655 and/or pre-designed haptic effects database 660 are in devices different from host source 602, the haptic data may be transmitted to haptic data converter 610 from each device.

Haptic data converter 610 generates original haptic metadata by converting the haptic data received from haptic sensor module 650, haptic data synthesizer 655 and/or pre-designed haptic effects database 660. The original haptic metadata may encode haptic information that specifies a type of haptic parameter(s) to be played back on a plurality of haptic-enabled devices 733 that will receive the haptic information.

Haptic data converter 610 transmits the original haptic metadata to a first encoder 617 that generates a haptic metadata packet for transmission over a broadcast network. First encoder 617 encodes the original haptic metadata into a haptic metadata packet suitable, for example, as a digital signal, for integration into a first broadcast signal. For example, the original haptic metadata may be encoded and stream as disclosed in U.S. patent application Ser. No. 14/286,591.

First encoder 617 may then transmit haptic metadata packet to a multiplexer 620. Multiplexer 620 combines the haptic metadata packet with an audio and/or visual metadata packet associated with the original haptic metadata to generate a composite signal, and transmits the composite signal to a broadcast network 625.

According to an alternative example embodiment, it may not be necessary or desirable to combine the haptic metadata packet generated by first encoder 617 with an audio and/or visual metadata packet. Thus, first encoder 617 may transmit the haptic metadata packet directly to broadcast network 625.

Broadcast network 625 integrates the composite signal (or, alternatively, only the haptic metadata packet) into a first broadcast signal, and then broadcasts (or transmits) the first broadcast signal including the haptic metadata packet to one or more haptic-enabled devices 733. Thus, the first broadcast signal sent by the broadcast network 625 to haptic-enabled devices 733 may be a point-to-multipoint broadcast signal. The first broadcast signal may be broadcast (or transmitted) by sending the broadcast signal to haptic-enabled devices 733 via transmission modes 627, 629, 631 that may be different from each other. For instance, transmission modes 627, 629, 631 may be selected from cable, direct broadcast satellite, a fiber-optic communication network, over-the-air programming, a wireless communication network, and radio waves.

Haptic-enabled devices 733 may each include any haptic playback media known in the art. For example, haptic-enabled devices 733 may be mobile devices (e.g., tablets, smartphones, etc.), wearable devices (e.g., glove, wristband, smart garment, etc.), actuator equipped furniture, televisions, gaming controllers, haptic-enabled head mounted displays (HMDs) (e.g., Oculus Rift, etc.) or similar devices.

Haptic-enabled devices 733 may include a haptic system 716. Haptic system 716 may include a decoder 635, a haptic playback capability generator 640, and a haptic renderer 670, and a pre-designed haptic effects database (not shown). Haptic system 716 may also include other elements known in the art, for example, a haptic/A/V synchronizer, a signal modulator, signal converter, filters, etc.

Decoder 635 in each of haptic-enabled devices 733 receives the first broadcast signal from broadcast network 625, and decodes the original haptic metadata from the first broadcast signal. Decoder 635 then sends the original haptic metadata to haptic playback capability generator 640.

Haptic playback capability generator 640 determines haptic playback capabilities of respective haptic-enabled device 733 for the original haptic metadata, and generates haptic playback capability information for respective haptic-enabled device 733. Haptic playback capability generator 640 may have software that determines the haptic playback capabilities by identifying a device type, and/or hardware configured to generate haptic effects, for respective haptic-enabled device 733.

According to an alternative example embodiment, the device type, and/or the hardware configured to generate haptic effects, may be identified using a validation device 643. Validation device 643 may be in a device different from respective haptic-enabled device 733, or in a device separate from haptic broadcast system 716.

If haptic playback capability generator 640 determines that compatible pre-designed haptic effects (i.e., pre-designed haptic effects compatible with the original haptic metadata) are stored in the pre-designed haptic effects database of haptic system 716, then the original haptic metadata is transmitted to haptic renderer 670 to generate haptic effects associated with the original haptic metadata.

If haptic playback capability generator 640 determines that compatible pre-designed haptic effects are not stored in the pre-designed haptic effects database of haptic system 716, then haptic playback capability generator 640 determines whether or not the original haptic metadata encodes haptic information or parameters compatible with the haptic playback capability information of respective haptic-enabled device 733.

If haptic playback capability generator 640 determines that the original haptic metadata encodes haptic information or parameters compatible with the haptic playback capability information of respective haptic-enabled device 733, then the original haptic metadata is transmitted to haptic renderer 670 to generate haptic effects associated with the original haptic metadata.

If haptic playback capability generator 640 determines that the original haptic metadata encodes haptic information or parameters incompatible with the haptic playback capability information of respective haptic-enabled device 733, the respective haptic playback capability information is transmitted to a second encoder 645.

Second encoder 645 encodes the haptic playback capability information into a haptic playback metadata packet, for example, as a digital signal, suitable for integration into a second broadcast signal. Second encoder 645 then transmits the haptic playback metadata packet to broadcast network 625.

Broadcast network 625 integrates the haptic playback metadata packet received from second encoder 645 into a second broadcast signal, and then broadcast (or transmits) the second broadcast signal including the haptic playback metadata packet to host source 602. Thus, the second broadcast signal sent by broadcast network 625 to host source 602 may be a point-to-point broadcast signal. The second broadcast signal may be broadcast (or transmitted) by the same, or a different, transmission mode as the first broadcast signal.

A decoder 647 in host source 602 receives the second broadcast signal from broadcast network 625, and decodes the respective haptic playback capability information from the haptic playback metadata packet received in the second broadcast signal. Decoder 647 may then transmit the haptic playback capability information to a select haptic playback generator 649.

Select haptic playback generator 649 generates select haptic metadata by modifying the original haptic metadata such that the select haptic metadata encodes select haptic information or parameters compatible with (or customized for) the respective haptic playback capability information. The original haptic metadata may be modified by adding additional haptic metadata to the original haptic metadata, removing unusable haptic metadata from the original haptic metadata, or changing (or, editing) at least one parameter of the original haptic metadata.

According to an example embodiment, select haptic playback generator 649 may select the select haptic effects for the select haptic metadata from a designated database.

According to an alternative example embodiment, decoder 647 may transmit the haptic playback capability information to haptic data synthesizer 655 where haptic effects compatible with (or customized for) the respective haptic playback capability information are re-created, and the re-created haptic effects are used to generate the select haptic information or parameters compatible with (or customized for) the respective haptic playback capability information.

According to yet another alternative example embodiment, decoder 647 may transmit the haptic playback capability information to pre-designed haptic effects database 660 where additional or other pre-designed haptic effects, which are (i) compatible with (or customized for) the respective haptic playback capability information and (ii) stored in pre-designed haptic effects database 660, are selected. The selected haptic effects are then used to generate the select haptic information or parameters compatible with (or customized for) the respective haptic playback capability information.

The select haptic information or parameters generated from the haptic effects provided by haptic data synthesizer 655 or pre-designed haptic effects database 660 are transmitted to haptic data converter 610. Haptic data converter 610 then generates the select haptic metadata by converting the select haptic information or parameters received from haptic data synthesizer 655 or pre-designed haptic effects database 660.

According to an example embodiment, an end-user can customize haptic effects generated by the haptic-enabled device by providing user preference(s) in the respective haptic playback capability information. For example, based on a user preference to ignore a specific event, the select haptic metadata may not encode haptic information for a haptic effect when that the specific event happens. In other words, the corresponding haptic metadata may not be transmitted in the select haptic metadata.

Select haptic playback generator 649, or haptic data converter 610, of host source 602 then sends the select haptic metadata in a third broadcast signal to respective haptic-enabled device 733 via encoder 617 (and, optionally, multiplexer 620) and broadcast network 625. The select haptic metadata may be encoded into a select haptic metadata packet by encoder 617, and then integrated into the third broadcast signal by broadcast network 625. Thus, the third broadcast signal sent by broadcast network 625 to respective haptic-enabled device 733 may be a point-to-point broadcast signal.

According to an example embodiment, the broadcast signal, the haptic playback capability information, and the select haptic metadata packet may each be sent (or, transmitted) through a same media broadcast stream of the respective haptic-enabled device.

According to example embodiments, by generating the select haptic metadata for the haptic-enabled device(s), example embodiments may include sending the select haptic metadata in a third broadcast signal having a smaller bandwidth, or smaller file size, than that used when broadcasting (or transmitting) the first broadcast signal.

Figure 7:
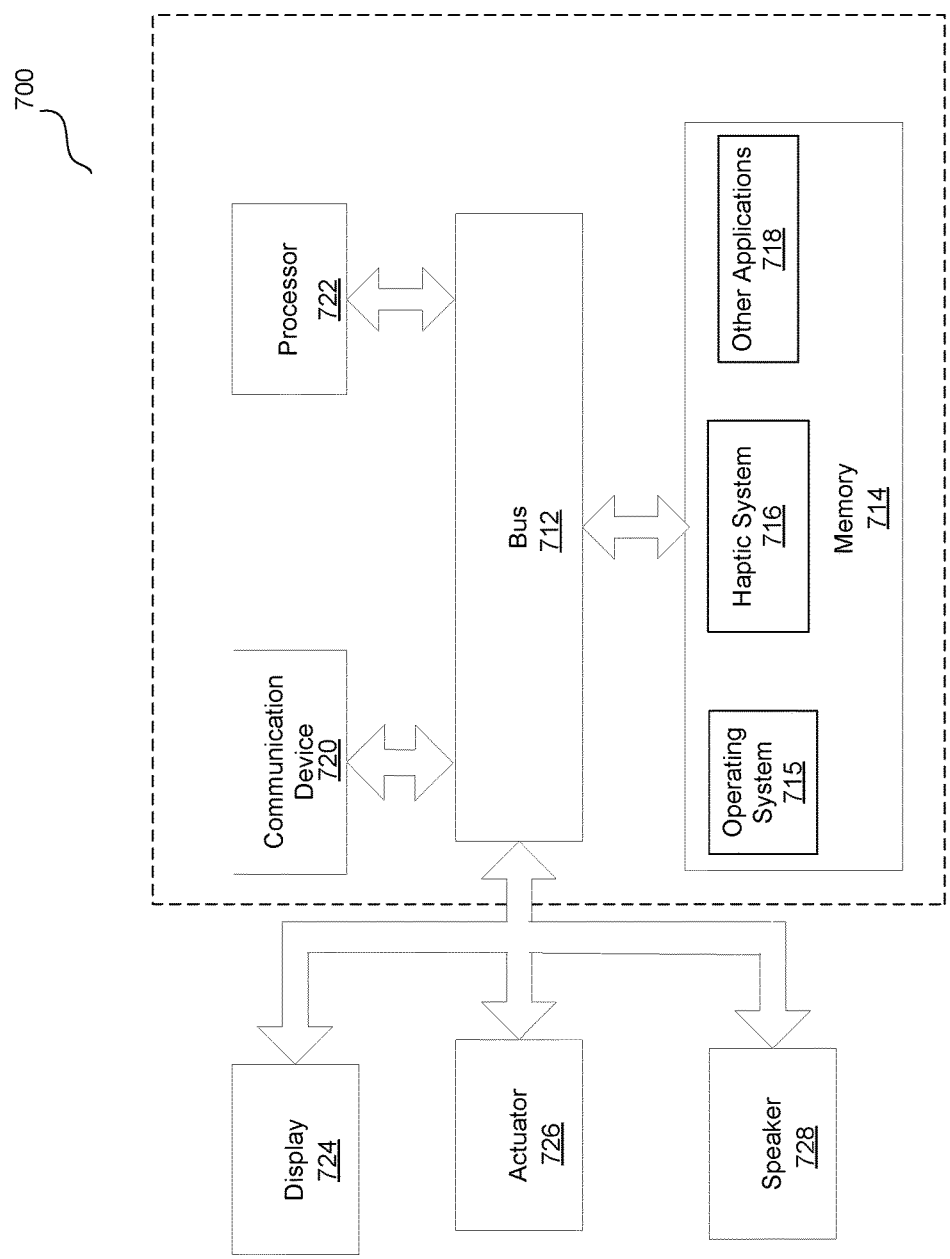

FIG. 7 is a block diagram of a system 700 in an end-user device according to an example embodiment. Some or all of the components of FIG. 7 can also be used to implement any of the elements of FIG. 6.

Referring to FIG. 7, system 700 in an end-user device according to an example embodiment determines haptic playback capability and provides haptic playback functionality for the end-user device. Alternatively, system 700 may be external to the end-user device, and remotely provides the haptic playback functionality for the end-user device.

Although shown as a single system, the functionality of system 700 can be implemented as a distributed system. System 700 includes a bus 712 or other communication mechanism for communicating information, and a processor 722 coupled to bus 712 for processing information. Processor 722 may be any type of general or specific purpose processor. System 700 further includes a memory 714 for storing information and instructions to be executed by processor 722. Memory 714 can be comprised of any combination of random access memory ("RAM"), read only memory ("ROM"), static storage such as a magnetic or optical disk, or any other type of computer-readable medium.

A computer-readable medium may be any available medium that can be accessed by processor 722, and may include both a volatile and nonvolatile medium, a removable and non-removable medium, a communication medium, and a storage medium. A communication medium may include computer readable instructions, data structures, program modules, or other data in a modulated data signal such as a carrier wave or other transport mechanism, and may include any other form of an information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of a storage medium known in the art.

According to an example embodiment, memory 714 stores software modules that provide functionality when executed by processor 722. The software modules include an operating system 715 that provides operating system functionality for system 700, as well as the rest of the end-user device. The software modules further include a haptic system 716 that determines haptic playback capability (as described above) and provides haptic playback functionality.

System 700 may further include a communication device 720 (e.g., a network interface card) that provides wireless network communication for infrared, radio, Wi-Fi, or cellular network communications. Alternatively, communication device 720 may provide a wired network connection (e.g., a cable/Ethernet/fiber-optic connection, or a modem).

Processor 722 is further coupled via bus 712 to a display 724 (e.g., a light-emitting display (LED) or a liquid crystal display (LCD)) for displaying a graphical representation or a user interface to an end-user. Display 724 may be a touch-sensitive input device (i.e., a touch screen) configured to send and receive signals from processor 722, and may be a multi-touch touch screen.

System 700 further includes at least one actuator 726. Processor 722 may transmit a haptic signal associated with a haptic effect to actuator 726, which in turn outputs haptic effects (e.g., vibrotactile haptic effects, electrostatic friction haptic effects, or deformation haptic effects). Actuator 726 includes an actuator drive circuit. Actuator 726 may be, for example, an electric motor, an electro-magnetic actuator, a voice coil, a shape memory alloy, an electro-active polymer, a solenoid, an eccentric rotating mass motor ("ERM"), a linear resonant actuator ("LRA"), a piezoelectric actuator, a high bandwidth actuator, or an electroactive polymer ("EAP") actuator.

Actuator 726 is an example of a haptic output device, where a haptic output device is a device including mechanisms configured to output any form of haptic effects, such as vibrotactile haptic effects, electrostatic friction haptic effects, deformation haptic effects, etc., in response to a drive signal. Accordingly, in an alternate example embodiment, actuator 726 can be replaced by some other type of haptic output device (not shown) that may be a non-mechanical or a non-vibratory device. Examples of non-mechanical or non-vibratory devices include a device that uses electrostatic friction ("ESF") or ultrasonic surface friction ("USF"), a device that induces acoustic radiation pressure with an ultrasonic haptic transducer, a device that uses a haptic substrate and a flexible or deformable surface or shape changing device and that may be attached to a user's body, a device that provides projected haptic output such as a puff of air using an air jet, a laser-based projectile, a sound-based projectile, etc.

According to an example embodiment, the laser-based projectile uses laser energy to ionize air molecules in a concentrated region mid-air so as to provide plasma (a concentrated mixture of positive and negative particles). The laser may be a femtosecond laser that emits pulses at very fast and very intense paces. The faster the laser, the safer for humans to touch. The laser-based projectile may appear as a hologram that is haptic and interactive. When the plasma comes in contact with a user's skin, the user may sense the vibrations of energized air molecules in the concentrated region. Sensations on the user skin are caused by the waves that are generated when the user interacts with plasma in mid-air. Accordingly, haptic effects may be provided to the user by subjecting the user to a plasma concentrated region. Alternatively, or additionally, haptic effects may be provided to the user by subjecting the user to the vibrations generated by directed sound energy.

According to an alternative example embodiment, a separate device from system 700 includes an actuator or another haptic output device that generates the haptic effects, and system 700 sends generated haptic signals to the separate device through communication device 720.

System 710 may include at least one speaker 728 to output audio effects. Processor 722 may transmit an audio signal to speaker 728, which in turn outputs audio effects. Speaker 728 may be, for example, a dynamic loudspeaker, an electrodynamic loudspeaker, a piezoelectric loudspeaker, a magnetostrictive loudspeaker, an electrostatic loudspeaker, a ribbon and planar magnetic loudspeaker, a bending wave loudspeaker, a flat panel loudspeaker, a heil air motion transducer, a plasma arc speaker, and a digital loudspeaker.

According to an alternative example embodiment, a separate device from system 700 includes speaker 728, and system 700 sends the audio signals to the separate device through communication device 720.

Example embodiments provide for reliable transmission and consistent playback of select (or customized) haptic data through a broadcast signal to end-user haptic-enabled devices (e.g., tablet, mobile telephone, television, gaming console, virtual reality system, etc.) without having to encode all possible haptic playback capabilities in the haptic data played back on the end-user haptic-enabled devices. According to example embodiments, transmission and playback of haptic effects from the select haptic data improves an end user's experience of the haptic effect because the select haptic data is customized for the haptic playback capabilities of the end-user haptic-enabled device.

The foregoing is illustrative of various example embodiments and is not to be construed as limiting thereof. Accordingly, all such modifications are intended to be included within the scope of the disclosure as defined in the claims.

What is claimed is:

1. A method of broadcasting select haptic metadata using a broadcast signal, comprising:
    broadcasting the broadcast signal from a host source to a plurality of haptic-enabled devices, the broadcast signal including original haptic metadata;
    receiving a first haptic playback capability information at the host source from a first haptic-enabled device of the plurality of haptic-enabled devices when the original haptic metadata encodes haptic information incompatible with the first haptic playback capability information;
    generating the select haptic metadata customized for the first haptic playback capability information; and
    sending the select haptic metadata from the host source to the first haptic-enabled device.

2. The method according to claim 1, wherein the generating the select haptic metadata includes selecting the select haptic metadata from a designated database.

3. The method according to claim 1, wherein
    the generating the select haptic metadata includes modifying the original haptic metadata, and
    the modifying includes adding additional haptic metadata to the original haptic metadata, removing unusable haptic metadata from the original haptic metadata, or changing at least one parameter of the original haptic metadata.

4. The method according to claim 1, wherein
    the first haptic playback capability information is generated by determining a haptic playback capability of the first haptic-enabled device for the original haptic metadata, and
    the determining the haptic playback capability of the first haptic-enabled device includes identifying at least one selected from (i) a device type, and (ii) hardware configured to generate haptic effects, for the first haptic-enabled device using software respectively embedded in the first haptic-enabled device, before playback of a haptic track corresponding to the original haptic metadata.

5. The method according to claim 1, wherein
    the first haptic playback capability information is generated by determining a haptic playback capability of the first haptic-enabled device for the original haptic metadata,
    the determining the haptic playback capability of the first haptic-enabled device includes identifying at least one selected from (i) a device type, and (ii) hardware configured to generate haptic effects, for the first haptic-enabled device using a validation device, before playback of a haptic track corresponding to the original haptic metadata, and
    the validation device is external to the first haptic-enabled device.

6. The method according to claim 1, wherein
    the broadcasting the broadcast signal includes sending the broadcast signal to the plurality of haptic-enabled devices via transmission modes different from each other, and
    the transmission modes are selected from cable, direct broadcast satellite, a fiber-optic communication network, over-the-air programming, a wireless communication network, and radio waves.

7. The method according to claim 1, wherein
    the broadcasting the broadcast signal includes sending the broadcast signal from the host source to the plurality of haptic-enabled devices through a first media broadcast stream,
    the receiving the first haptic playback capability information includes receiving the first haptic playback capability information through the first media broadcast stream, and
    the sending the select haptic metadata includes sending the select haptic metadata to the first haptic-enabled device through the first media broadcast stream.

8. The method according to claim 1, wherein the haptic information encoded by the original haptic metadata specifies a type of haptic parameter(s) to be played back on the plurality of haptic-enabled devices.

9. A haptic broadcast system, comprising:
    a broadcast network broadcasting a broadcast signal to a plurality of haptic-enabled devices, the broadcast signal including original haptic metadata; and
    a host source from which the broadcast network receives the original haptic metadata, the host source
    (i) receiving a first haptic playback capability information from a first haptic-enabled device of the plurality of haptic-enabled devices when the original haptic metadata encodes haptic information incompatible with the first haptic playback capability information,
    (ii) generating select haptic metadata customized for the first haptic playback capability information, and
    (iii) sending the select haptic metadata from the host source to the first haptic-enabled device.

10. The haptic broadcast system of claim 9, further comprising:
    a designated database from which the select haptic metadata is selected.

11. The haptic broadcast system of claim 9, wherein
    the host source includes a select haptic metadata generator generating the select haptic metadata by modifying the original haptic metadata, and
    the select haptic metadata generator modifies the original haptic metadata by adding additional haptic metadata to the original haptic metadata, removing unusable haptic metadata from the original haptic metadata, or changing at least one parameter of the original haptic metadata.

12. The haptic broadcast system of claim 9, wherein
    the first haptic-enabled device includes (i) embedded software, and (ii) a haptic playback capability generator generating the first haptic playback capability information by determining a haptic playback capability of the first haptic-enabled device for the original haptic metadata, and
    the haptic playback capability generator determines the haptic playback capability of the first haptic-enabled device by identifying at least one selected from (i) a device type, and (ii) hardware configured to generate haptic effects, for the first haptic-enabled device using the embedded software in the first haptic-enabled device, before playback of a haptic track corresponding to the original haptic metadata.

13. The haptic broadcast system of claim 9, further comprising:
    a validation device externally connected to the first haptic-enabled device, wherein the first haptic-enabled device includes a haptic playback capability generator generating the first haptic playback capability information by determining a haptic playback capability of the first haptic-enabled device for the original haptic metadata, and wherein the haptic playback capability generator determines the haptic playback capability of the first haptic-enabled device by identifying at least one selected from (i) a device type, and (ii) hardware configured to generate haptic effects, for the first haptic-enabled device using the validation device, before playback of a haptic track corresponding to the original haptic metadata.

14. The haptic broadcast system of claim 9, wherein the plurality of haptic-enabled devices receive the broadcast signal via transmission modes different from each other, and the transmission modes are selected from cable, direct broadcast satellite, a fiber-optic communication network, over-the-air programming, a wireless communication network, and radio waves.

15. The haptic broadcast system of claim 9, wherein the broadcast network broadcasts the broadcast signal by sending the broadcast signal to the plurality of haptic-enabled devices through a first media broadcast stream, and the hosts source receives the first haptic playback capability information through the first media broadcast stream, and sends the select haptic metadata to the first haptic-enabled device through the first media broadcast stream.

16. The haptic broadcast system of claim 9, wherein the haptic information encoded by the original haptic metadata specifies a type of haptic parameter(s) to be played back on the plurality of haptic-enabled devices.

17. A non-transitory computer-readable medium having instructions stored thereon that, when executed by a processor, cause the processor to:

broadcast, using a broadcast network, a broadcast signal to a plurality of haptic-enabled devices, the broadcast signal including original haptic metadata received from a host source;

receive, at the host source, a first haptic playback capability information from a first haptic-enabled device of the plurality of haptic-enabled devices when the original haptic metadata encodes haptic information incompatible with the first haptic playback capability information;

generate, at the host source, select haptic metadata customized for the first haptic playback capability information; and send the select haptic metadata from the host source to the first haptic-enabled device.

18. The non-transitory computer-readable medium of claim 17, wherein to generate the select haptic metadata includes to modify the original haptic metadata using a select haptic metadata generator in the host source, and to modify includes to add additional haptic metadata to the original haptic metadata, to remove unusable haptic metadata from the original haptic metadata, or to change at least one parameter of the original haptic metadata.

19. The non-transitory computer-readable medium of claim 17, wherein the instructions further cause the processor to generate the first haptic playback capability information by determining a haptic playback capability of the first haptic-enabled device for the original haptic metadata using a haptic playback capability generator in the first haptic-enabled device, and the determining the haptic playback capability of the first haptic-enabled device includes identifying at least one selected from (i) a device type, and (ii) hardware configured to generate haptic effects, for the first haptic-enabled device using either software embedded in the first haptic-enabled device or a validation device external to the first haptic-enabled device, before playback of a haptic track corresponding to the original haptic metadata.

20. The non-transitory computer-readable medium of claim 17, wherein to broadcast, using the broadcast network, the broadcast signal includes sending the broadcast signal to the plurality of haptic-enabled devices via transmission modes different from each other, the transmission modes being selected from cable, direct broadcast satellite, a fiber-optic communication network, over-the-air programming, a wireless communication network, and radio waves.

\* \* \* \* \*